United States Patent
Haga (10) Patent No.: US 12,328,022 B2
(45) Date of Patent: Jun. 10, 2025

(54) BATTERY MANAGEMENT SYSTEM

(71) Applicant: TOYOTA JIDOSHA KABUSHIKI KAISHA, Toyota (JP)

(72) Inventor: Nobuyasu Haga, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 18/216,243

(22) Filed: Jun. 29, 2023

(65) Prior Publication Data

US 2024/0088687 A1    Mar. 14, 2024

(30) Foreign Application Priority Data

Sep. 13, 2022 (JP) .................................. 2022-145153

(51) Int. Cl.
*H02J 7/00* (2006.01)
*G07C 5/00* (2006.01)
*G07C 5/02* (2006.01)

(52) U.S. Cl.
CPC ............ *H02J 7/0049* (2020.01); *G07C 5/008* (2013.01); *G07C 5/02* (2013.01); *H02J 7/0068* (2013.01); *Y02T 10/70* (2013.01)

(58) Field of Classification Search
CPC ...... H02J 7/0049; H02J 7/0068; G07C 5/008; G07C 5/02
See application file for complete search history.

(56) References Cited

U.S. PATENT DOCUMENTS

| | | | |
|---|---|---|---|
| 2015/0380951 A1* | 12/2015 | Okamoto | H02J 50/80 307/104 |
| 2017/0117587 A1* | 4/2017 | Sugeno | H01M 10/48 |
| 2020/0332734 A1 | 10/2020 | To et al. | |
| 2021/0334719 A1* | 10/2021 | Hishida | G06Q 10/1093 |

FOREIGN PATENT DOCUMENTS

| | | |
|---|---|---|
| JP | 2000-357541 A | 12/2000 |
| JP | 2004-124846 A | 4/2004 |
| JP | 2020-178473 A | 10/2020 |

* cited by examiner

*Primary Examiner* — Michael C Zarroli
(74) *Attorney, Agent, or Firm* — Oliff PLC (57) ABSTRACT

The battery management system includes a vehicle and a center. The vehicle includes an acquisition unit that acquires vehicle data, and a transmission unit that transmits the vehicle data to the center. The center includes a reception unit that receives vehicle data from the vehicle, and a determination unit that determines a state of the battery based on the vehicle data. When the vehicle is not parked, the determination unit determines that the battery is in a temporary overdischarge state, when the voltage of the battery when the vehicle is started is less than a first voltage and the integrated value of the charge and discharge amount of the battery is in a first state in which the integrated value of the charge and discharge amount of the battery is less than a first charge and discharge amount.

6 Claims, 8 Drawing Sheets

BATTERY MANAGEMENT SYSTEM

CROSS-REFERENCE TO RELATED APPLICATION

This application claims priority to Japanese Patent Application No. 2022-145153 filed on Sep. 13, 2022, incorporated herein by reference in its entirety.

BACKGROUND

1. Technical Field

The present disclosure relates to a battery management system that manages a battery mounted on a vehicle.

2. Description of Related Art

Japanese Unexamined Patent Application Publication No. 2004-124846 (JP 2004-124846 A) discloses an engine starting device that measures a voltage of a battery mounted on a vehicle, and that suppresses the battery from being dead by starting an engine to charge the battery when a measured voltage is equal to or lower than a predetermined value.

SUMMARY

The voltage of the battery mounted on the vehicle varies depending on a temperature change of the battery, equipment mounted on the vehicle, and the like. As a result, it is difficult to accurately detect a state of the battery such as a temporary overdischarge state or a deteriorated state, only by a change in the voltage of the battery. Therefore, there is room for consideration regarding a method of detecting the state of the battery.

The present disclosure has been made in view of the above issue, and an object of the present disclosure is to provide a battery management system capable of accurately detecting a state of an in-vehicle battery such as a temporary overdischarge state or a deteriorated state.

A battery management system according to a first aspect of the disclosed technique includes: a vehicle; and a center. The vehicle includes an acquisition unit configured to acquire vehicle data including information on traveling and information on a voltage and a charge and discharge amount of a battery to be mounted. The vehicle includes a transmission unit configured to transmit the vehicle data to the center. The center includes a reception unit configured to receive the vehicle data from the vehicle. The center includes a determination unit configured to determine a state of the battery based on the vehicle data. When the vehicle is not parked, the determination unit is configured to integrate the charge and discharge amount of the battery every time the vehicle data is received, and reset an integrated value when a full charge state of the battery is detected. When the vehicle is not parked, the determination unit determines that the battery is in a temporary overdischarge state, when the voltage of the battery when the vehicle is started is less than a first voltage and the integrated value of the charge and discharge amount of the battery is in a first state in which the integrated value of the charge and discharge amount of the battery is less than a first charge and discharge amount.

In accordance with the battery management system of the present disclosure, since both the voltage of the in-vehicle battery when the vehicle is started and the charge and discharge amount of the in-vehicle battery are used, it is possible to suppress the error influence of both, and it is possible to accurately detect the state of the in-vehicle battery such as a temporary overdischarge state and a deteriorated state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The battery management system of the present disclosure detects the state of the in-vehicle battery by using both the voltage of the in-vehicle battery and the charge/discharge amount of the in-vehicle battery at the time of starting the vehicle. As a result, it is possible to suppress the influence of the error of the voltage and the charge-discharge amount on the in-vehicle battery, and thus it is possible to accurately detect the state of the in-vehicle battery such as the temporary overdischarge and the deterioration. Hereinafter, an embodiment of the present disclosure will be described in detail with reference to the drawings.

Embodiment

Configuration

Figure 1:
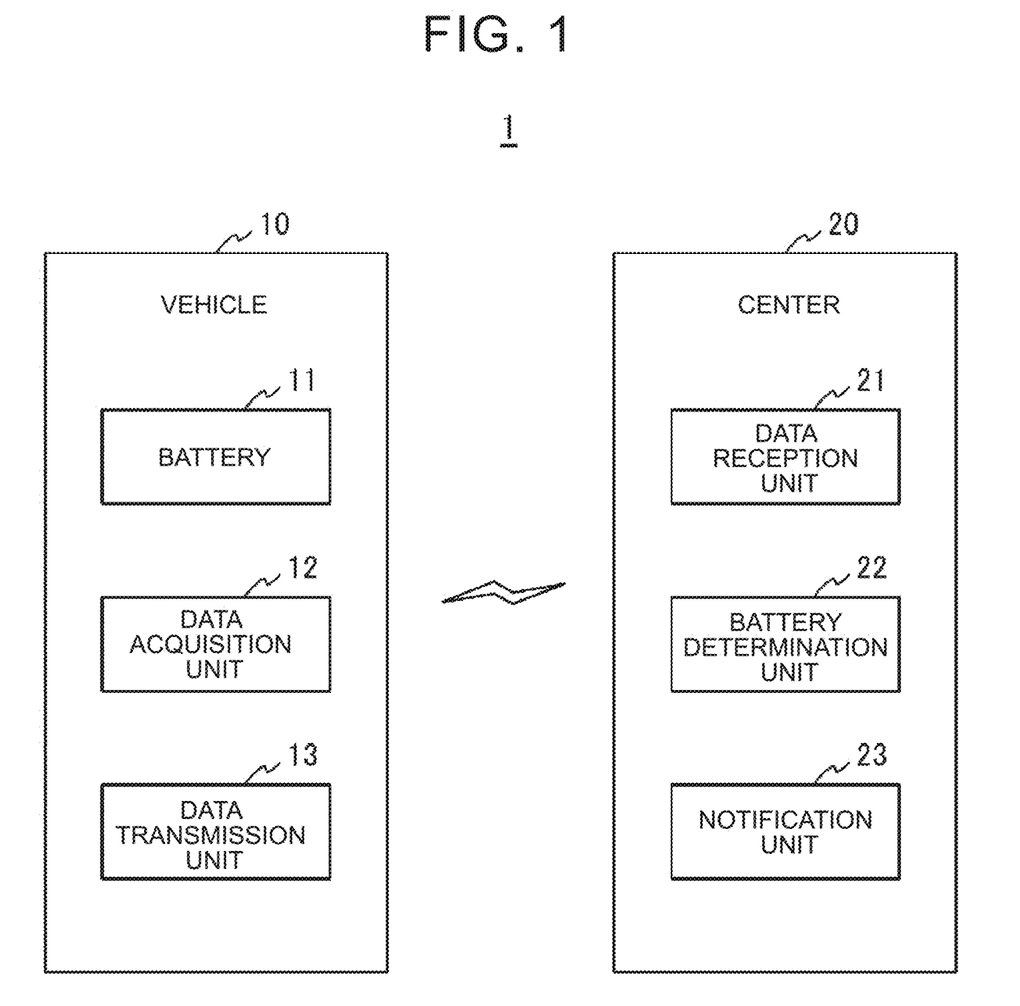
FIG. 1 is a schematic configuration diagram of a battery management system according to an embodiment of the present disclosure.

FIG. 1 is a block diagram illustrating a schematic configuration of a battery management system 1 according to an embodiment of the present disclosure. The battery management system 1 illustrated in FIG. 1 includes a vehicle 10 and a center 20 in a configuration.

(1) Vehicle

The vehicle 10 is communicably connected to the center 20. The vehicle 10 is, for example, an automobile, and includes at least a battery 11, a data acquisition unit 12, and a data transmission unit 13. Although FIG. 1 illustrates an example in which one vehicle is communicably connected to the center 20, a plurality of vehicles 10 may be communicably connected to the center 20.

The battery 11 is a secondary battery configured to be chargeable and dischargeable, such as a lithium ion battery or a lead storage battery. As the battery 11, an auxiliary battery can be exemplified. The battery 11 is charged by a generator (not shown) such as an alternator, and is capable of supplying (discharging) electric power stored therein to an accessory, equipment, or the like (not shown) mounted on the vehicle 10.

The data acquisition unit 12 is configured to acquire vehicle data at predetermined intervals or irregularly. The vehicle data includes information related to the travel of the vehicle 10 and information related to the battery 11 of the vehicle 10. Examples of the information regarding the traveling of the vehicle 10 include a state (ON/OFF) of an ignition switch of the vehicle 10, a time (vehicle operating time) during which the vehicle 10 is operating while the ignition switch is in an ON state, and the like. Examples of the information regarding the battery 11 of the vehicle 10 include a voltage (start-up voltage, open-circuit voltage), a current (discharge current, charge current), a charge/discharge amount, a State Of Charge (SOC), and an internal-resistance value of the battery 11. The information related to the battery 11 can be detected by using a detection element (a voltage sensor, a current sensor, a temperature sensor, or the like) (not shown) provided in the battery 11 or the like, or can be calculated or estimated from the detected value.

Here, the charge/discharge amount of the battery 11 is a total value of the charge current and the discharge current in a case where the current (charge current) flowing into the battery 11 for charging is a positive value and the current (discharge current) flowing out of the battery 11 for discharging is a negative value. Hereinafter, a state in which the battery 11 maintains a fully charged state (SOC=100%) is defined as a charge/discharge rate of zero. The charge/discharge amount includes a charge/discharge amount when the ignition switch is in ON state and a charge/discharge amount when the ignition switch is in OFF state.

The data transmission unit 13 has a function of controlling communication between the vehicle 10 and the center 20. The data transmission unit 13 transmits the vehicle data acquired by the data acquisition unit 12 to the center 20. The data transmission unit 13 is realized by, for example, a data communication module (DCM).

(2) Center

The center 20 is communicably connected to the vehicle 10. The center 20 is, for example, a server on the cloud, and includes at least a data reception unit 21, a battery determination unit 22, and a notification unit 23.

The data reception unit 21 has a function of controlling communication between the center 20 and the vehicle 10. The data reception unit 21 can receive vehicle data transmitted from the vehicle 10.

The battery determination unit 22 is configured to determine the state of the battery 11 based on the vehicle data received by the data reception unit 21. The state of the battery 11 determined by the battery determination unit 22 can be exemplified by a data inconsistency state in which there is no consistency in changes in a plurality of data, a temporary overdischarge state (reversible) in which the battery 11 is temporarily overdischarged, and a deterioration state in which the battery 11 is deteriorated (aged deteriorated, etc.). Details of the method of determining the state of the battery 11 will be described later.

The notification unit 23 performs appropriate notification according to the state of the battery 11 determined by the battery determination unit 22. This notification can perform different notifications (contents, methods, and the like) between the case where the battery 11 is in the temporary overdischarge state (voltage drop) and the case where the battery 11 is in the deteriorated state. Examples of the notification destination include a user and a driver of the vehicle 10.

Control

Next, the control performed by the battery management system 1 according to the present embodiment will be described with further referring to FIGS. 2A to 2E, FIG. 3, and FIG. 4. FIG. 2A to FIG. 2E are each a diagram illustrating a battery management control process executed by the center 20 of the battery management system 1. The processes of the FIG. 2A, FIG. 2B, FIG. 2C, FIG. 2D, and FIG. 2E are combined with Couplers A, B, C, D, and E, respectively.

The battery management control illustrated in FIG. 2A to FIG. 2E is started by, for example, establishment of communication between the vehicle 10 and the center 20, and is repeatedly executed until the communication between the vehicle 10 and the center 20 is disconnected.

Figure 2A:
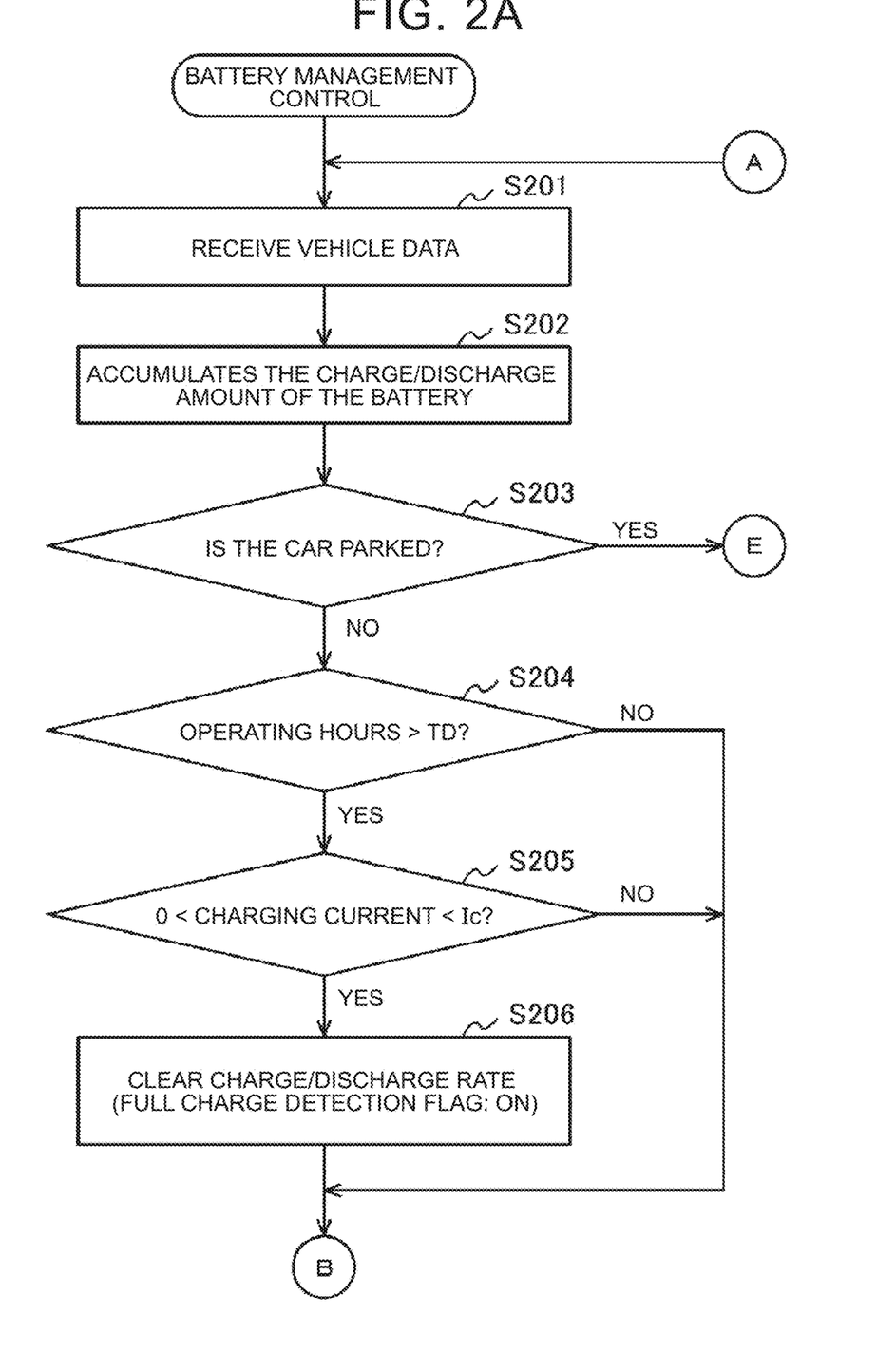
FIG. 2A is a diagram of a battery management control process executed by a battery management system.

The data reception unit 21 of the center 20 receives the vehicle data transmitted from the data transmission unit 13 of the vehicle 10. The received vehicle data is stored in a predetermined storage unit (not shown) or the like. When the vehicular data is received by the data reception unit 21, the process proceeds to S202.

S202

The battery determination unit 22 of the center 20 integrates the charge/discharge amount (current value) of the battery 11 included in the vehicle data received by S201 into the charge/discharge amount (integrated value) of the battery 11 integrated so far. The charge/discharge amount (integrated value) of the battery 11 is a value obtained by integrating the charge/discharge amount after the determination of the full charge detection (S206), which will be described later, among the charge/discharge amounts of the batteries 11 included in the respective vehicle data received in the respective flows up to the previous time. When the charge/discharge amount of the battery 11 is integrated by the battery determination unit 22, the process proceeds to S203.

S203

The battery determination unit 22 of the center 20 determines whether or not the vehicle 10 is parked. Whether or not the vehicle 10 is parked, that is, whether or not the traveling system of the vehicle 10 is not in operation, can be determined based on the information on the traveling of the vehicle 10 included in the vehicle data. When the battery determination unit 22 determines that the vehicle 10 is parking (S203, Yes), the process proceeds to S241. On the other hand, when the battery determination unit 22 determines that the vehicle 10 is not parked (S203, No), the process proceeds to S204.

S204

The battery determination unit 22 of the center 20 determines whether or not the time (vehicle operation time) during which the vehicle 10 is operating exceeds a predetermined time TD. This determination is made to determine whether the battery 11 is sufficiently charged. Therefore, in the predetermined time TD, a time (for example, 20 minutes) required for determining that the battery 11 is fully charged is set. When the battery determination unit 22 determines that the operating time of the vehicles exceeds the time TD (S204, Yes), the process proceeds to S205. On the other hand, when the battery determination unit 22 determines that the operating time of the vehicles does not exceed the time TD (S204, No), the process proceeds to S211.

S205

The battery determination unit 22 of the center 20 determines whether or not the charge current flowing into the battery 11 is greater than zero and less than a predetermined current Ic. This determination is made to determine whether the battery 11 is sufficiently charged. Therefore, an appropriate current (for example, 2.5 A) flowing as a charging current when the battery 11 is nearly fully charged is set in the predetermined current Ic based on the capacity of the battery 11 or the like. When the battery determination unit 22 determines that the charge current of the battery 11 is greater than zero and less than the current Ic (S205, Yes), the process proceeds to S206. On the other hand, when the battery determination unit 22 determines that the charge current of the battery 11 is equal to or larger than the current Ic (S205, No), the process proceeds to S211.

S206

The battery determination unit 22 of the center 20 clears (zeros) the charge/discharge amounts thus far accumulated in the above-described S202. This is because a state in which the battery 11 maintains a fully charged state (SOC=100%) is defined as a charge/discharge rate of zero. Therefore, when the full charge of the battery 11 is detected, the integrated value of the charge/discharge amount is set to zero, and the offset error or the like of the current sensor accumulated over a long period of time is reset. As a result, the influence of a detection error or the like in the current sensor can be suppressed. Note that the fact that the charge/discharge rate of the battery 11 is cleared may be indicated by ON of a predetermined flag (full charge detection flag). When the charge/discharge rate of the battery 11 is cleared by the battery determination unit 22, the process proceeds to S211.

S211

Figure 2B:
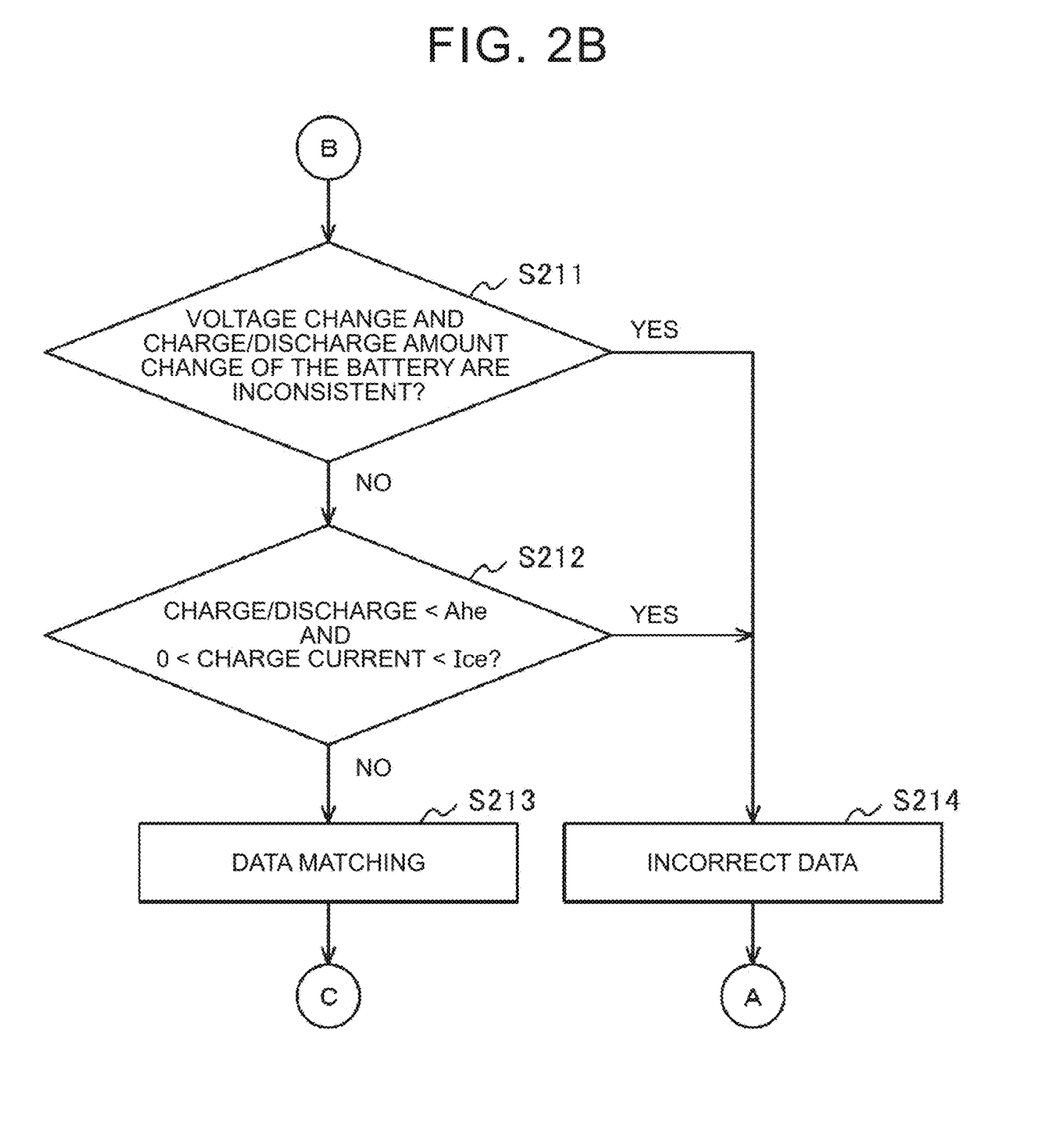
FIG. 2B is a diagram of a battery management control process executed by a battery management system.

The battery determination unit 22 of the center 20 determines whether or not the voltage change of the battery 11 and the charge/discharge amount change of the battery 11 are inconsistent with each other based on the vehicle data. More specifically, for example, when the voltage of the battery 11 is lowered even though the charge/discharge amount of the battery 11 is a positive value indicating charge, there is no consistency as a normal electrical change. In this case, there is a concern that the variation in voltage and the offset error of the current sensor are larger than expected. When the battery determination unit 22 determines that the voltage change of the battery 11 and the charge/discharge amount change of the battery 11 are inconsistent (S211, Yes), the process proceeds to S214. On the other hand, when the battery determination unit 22 determines that the voltage change of the battery 11 matches the charge/discharge amount change of the battery 11 (S211, No), the process proceeds to S212.

S212

Based on the vehicle data, the battery determination unit 22 of the center 20 determines whether the charge/discharge amount of the battery 11 is less than the predetermined charge/discharge amount Ahe and whether the charge current flowing into the battery 11 is greater than zero and less than the predetermined current Ice. This determination also determines the consistency between the change in the charge/discharge amount of the battery 11 and the change in the charge current. More specifically, for example, when the charge/discharge rate of the battery 11 is a negative value indicating discharging, that is, when the charge current of the battery 11 in operation is small in spite of a low power storage rate (low SOC) of the battery 11, there is no consistency as a normal electric change. In this case, there is a concern that charging is performed immediately after the battery 11 is replaced or from an external charger or the like. Note that the predetermined charge/discharge amount Ahe and the predetermined current Ice are set to appropriate values that can determine the above-described consistency. When the battery determination unit 22 determines that the charge/discharge amount of the battery 11 is less than the charge/discharge amount Ahe and that the charge current of the battery 11 is greater than zero and less than the current Ice (S212, Yes), the process proceeds to S214. On the other hand, when the battery determination unit 22 determines that the charge/discharge amount of the battery 11 is equal to or greater than the charge/discharge amount Ahe or that the charge current of the battery 11 is greater than zero and equal to or greater than the current Ice (S212, No), the process proceeds to S213.

S213

The battery determination unit 22 of the center 20 determines that the change in the voltage, the change in the charge/discharge amount, and the change in the charge current of the battery 11 based on the vehicle data are electrically consistent (data matching). When the battery determination unit 22 determines the data-matching, the process proceeds to S221.

S214

The battery determination unit 22 of the center 20 determines that there is no electrical consistency in the change in the voltage, the change in the charge/discharge amount, and the change in the charge current of the battery 11 based on the vehicle data (data inconsistency). The status of data matching/inconsistency may be expressed by switching ON/OFF of a predetermined flag. When the battery determination unit 22 determines the data inconsistency, the process proceeds to S201.

In the event of a data-inconsistency, the battery managing control may be terminated without returning to S201 process. In the case of data inconsistency, the notification unit 23 of the center 20 may notify a user or a driver of the vehicle 10 (display on an in-vehicle display or the like) that the data related to the battery 11 is inconsistent.

S221

Figure 2C:
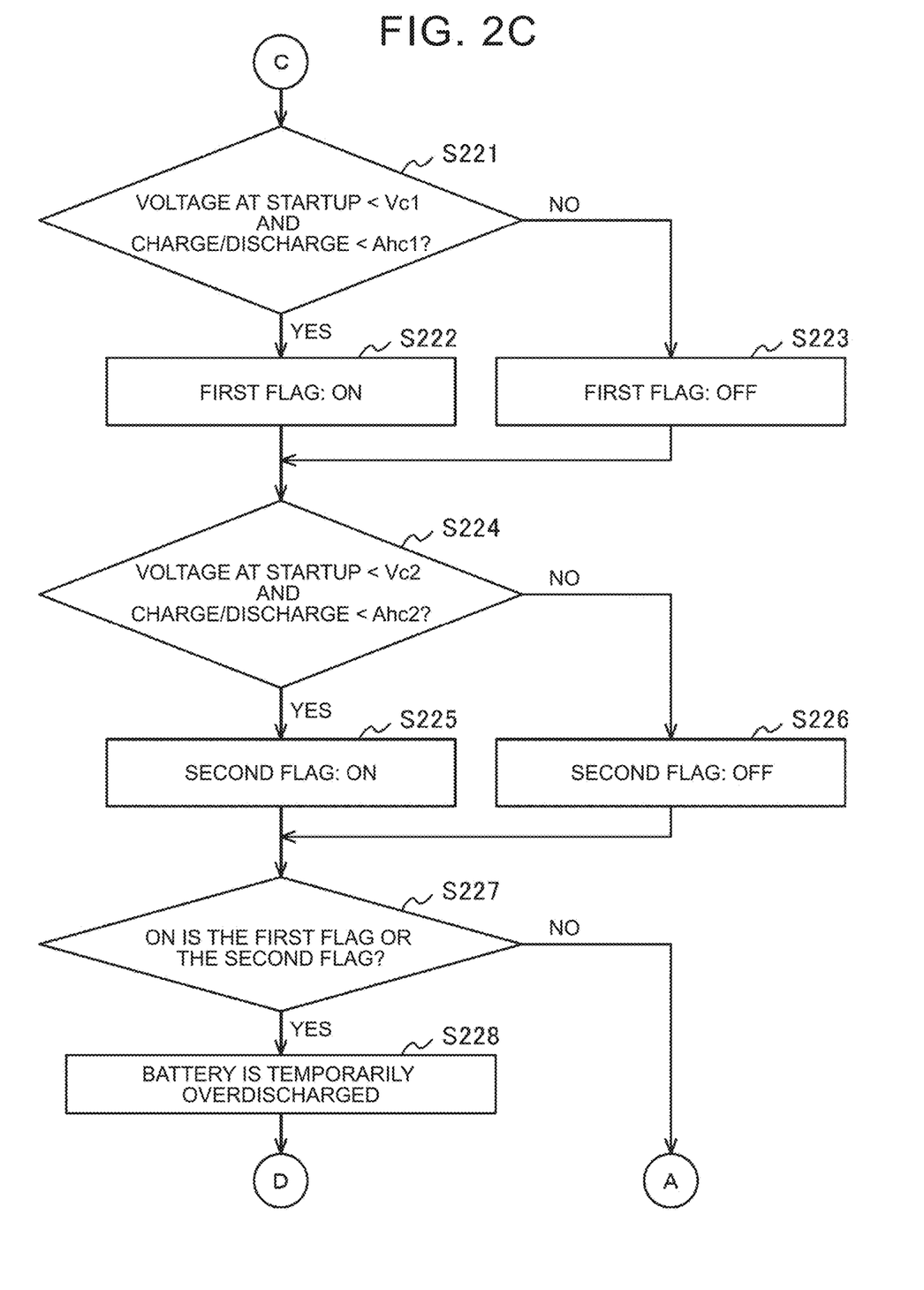
FIG. 2C is a diagram of a battery management control process executed by a battery management system.

Based on the vehicle data, the battery determination unit 22 of the center 20 determines whether or not the voltage (starting voltage) of the battery 11 during the starting operation of the vehicle 10 is less than the predetermined first voltage Vc1 and the charge/discharge amount of the battery 11 is less than the predetermined first charge/discharge amount Ahc1. This determination is made in order to determine whether or not the normal battery 11 is temporarily in an overdischarge state (voltage drop). The starting operation of the vehicle 10 is an operation of driving a starter motor in the case of an internal combustion engine vehicle, and is an operation of starting a control system in the case of an electrified vehicle. The voltage (startup voltage) of the battery 11 during the startup operation is a value of the voltage that is reduced by the power consumption of the load when the startup operation is executed. Therefore, the first voltage Vc1 and the first charge/discharge amount Ahc1 are set to appropriate values that can determine that the normal battery 11 can supply electric power (voltage, current, and storage rate) required for the start-up operation of the vehicle 10 based on the capacity of the battery 11, the specifications of the vehicle 10, and the like.

Figure 3:
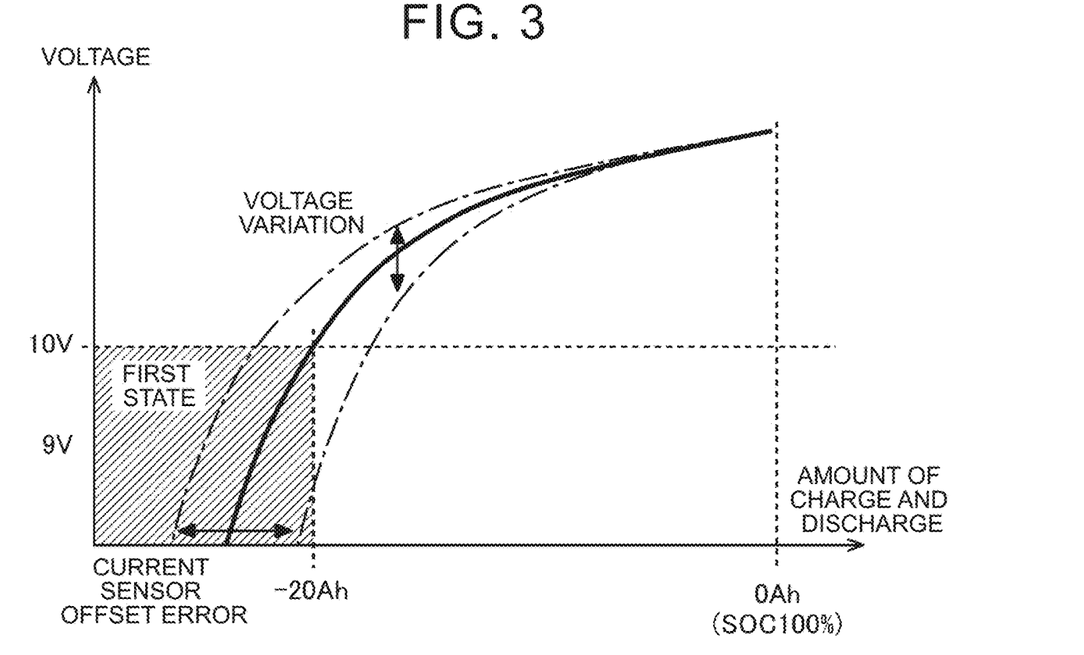
FIG. 3 is a diagram illustrating an example of a relationship between a voltage of a battery and a charge/discharge amount.

An exemplary setting of the first voltage Vc1 and the first charge/discharge amount Ahc1 will be described using the relation between the voltage (vertical axis) and the charge/discharge amount (horizontal axis) of the normal battery 11 illustrated in FIG. 3. As shown in FIG. 3, the voltage of the battery 11 decreases as the power storage rate (SOC) of the battery 11 decreases (solid line). This change varies due to a voltage variation and an offset error of the current sensor (dashed-dotted line). In FIG. 3, the first voltage Vc1=10V and the first charge/discharge amount Ahc1=−20 Ah are set, and it is determined whether or not the battery 11 is in the "first state" in which the voltage is less than 10V and the charge/discharge amount is less than −20 Ah.

When the battery determination unit 22 determines that the start-up voltage of the battery 11 is less than the first voltage Vc1 and the charge/discharge amount of the battery 11 is less than the first charge/discharge amount Ahc1 (S221, Yes), the process proceeds to S222. On the other hand, when the battery determination unit 22 determines that the start-up voltage of the battery 11 is equal to or greater than the first voltage Vc1 or that the charge/discharge amount of the battery 11 is equal to or greater than the first charge/discharge amount Ahc1 (S221, No), the process proceeds to S223.

S222

The battery determination unit 22 of the center 20 turns ON the first flag provided in advance. When the battery determination unit 22 turns ON the first flag, the process proceeds to S224.

S223

The battery determination unit 22 of the center 20 turns OFF the first flag provided in advance. When the battery determination unit 22 turns OFF the first flag, the process proceeds to S224.

S224

Based on the vehicle data, the battery determination unit 22 of the center 20 determines whether or not the voltage (starting voltage) of the battery 11 during the starting operation of the vehicle 10 is less than the predetermined second voltage Vc2 and the charge/discharge amount of the battery 11 is less than the predetermined second charge/discharge amount Ahc2. This determination is made in order to determine whether or not the battery 11 estimated to have deteriorated is temporarily in the over-discharge state. The voltage (starting voltage) of the battery 11 during the starting operation and the starting operation of the vehicle 10 is as described above. Therefore, the second voltage Vc2 and the second charge/discharge amount Ahc2 are set to appropriate values that can determine that the battery 11 having deteriorated power (voltage, current, and storage rate) required for the start-up operation of the vehicle 10 can be supplied, based on the capacity of the battery 11, the specifications of the vehicle 10, and the like.

Figure 4:
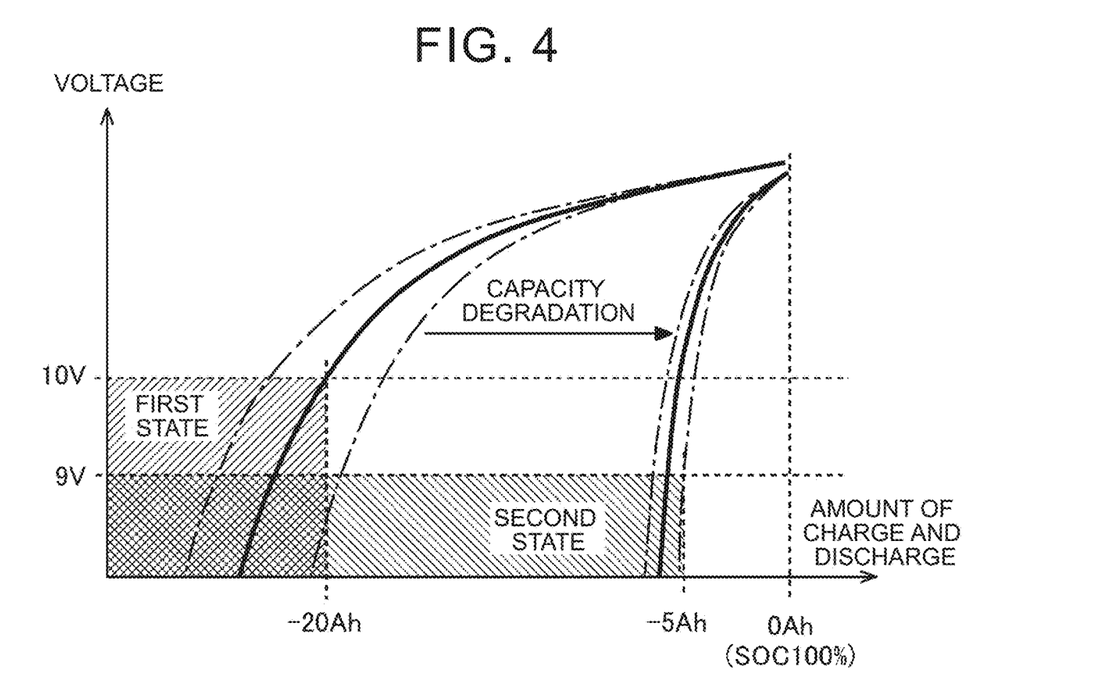
FIG. 4 is a diagram illustrating an example of a relationship between a voltage of a battery and a charge/discharge amount.

An exemplary setting of the second voltage Vc2 and the second charge/discharge amount Ahc2 will be described using the relation between the voltage (vertical axis) and the charge/discharge amount (horizontal axis) of the normal and deteriorated battery 11 illustrated in FIG. 4. As shown in FIG. 4, when the capacity of the battery 11 deteriorates, the voltage of the battery 11 sharply decreases with a small charge/discharge amount. In order to cover this deteriorated state, in the embodiment of FIG. 4, the second voltage Vc2=9V and the second charge/discharge amount Ahc2=−5 Ah are set, and it is determined whether or not the battery 11 is in the "second state" in which the voltage is less than 9V and the charge/discharge amount is less than ~5 Ah.

When the battery determination unit 22 determines that the start-up voltage of the battery 11 is less than the second voltage Vc2 and the charge/discharge amount of the battery 11 is less than the second charge/discharge amount Ahc2 (S224, Yes), the process proceeds to S225. On the other hand, when the battery determination unit 22 determines that the start-up voltage of the battery 11 is equal to or higher than the second voltage Vc2 or that the charge/discharge amount of the battery 11 is equal to or higher than the second charge/discharge amount Ahc2 (S224, No), the process proceeds to S226.

S225

The battery determination unit 22 of the center 20 turns ON a second flag provided in advance. When the second flag is turned ON by the battery determination unit 22, the process proceeds to S227.

S226

The battery determination unit 22 of the center 20 turns OFF a second flag provided in advance. When the second flag is turned OFF by the battery determination unit 22, the process proceeds to S227.

S227

The battery determination unit 22 of the center 20 determines whether or not at least one of the first flag and the second flag is ON. When the battery determination unit 22 determines that at least one of the first flag and the second flag is ON (S227, Yes), the process proceeds to S228. On the other hand, when the battery determination unit 22 determines that both the first flag and the second flag are OFF (S227, No), the process proceeds to S201.

S228

The battery determination unit 22 of the center 20 determines that the battery 11 is temporarily in an over-discharge state. When the battery determination unit 22 determines that the battery 11 is temporarily over-discharged, the process proceeds to S231. When it is determined that the battery 11 is temporarily in the over-discharge state, the notification unit 23 of the center 20 may notify the user or the driver of the vehicle 10 of the fact that the battery 11 is in the over-discharge state and the contents urging the charging of the battery 11 (such as display on an in-vehicle display or message transmission to a smartphone).

S231

Figure 2D:
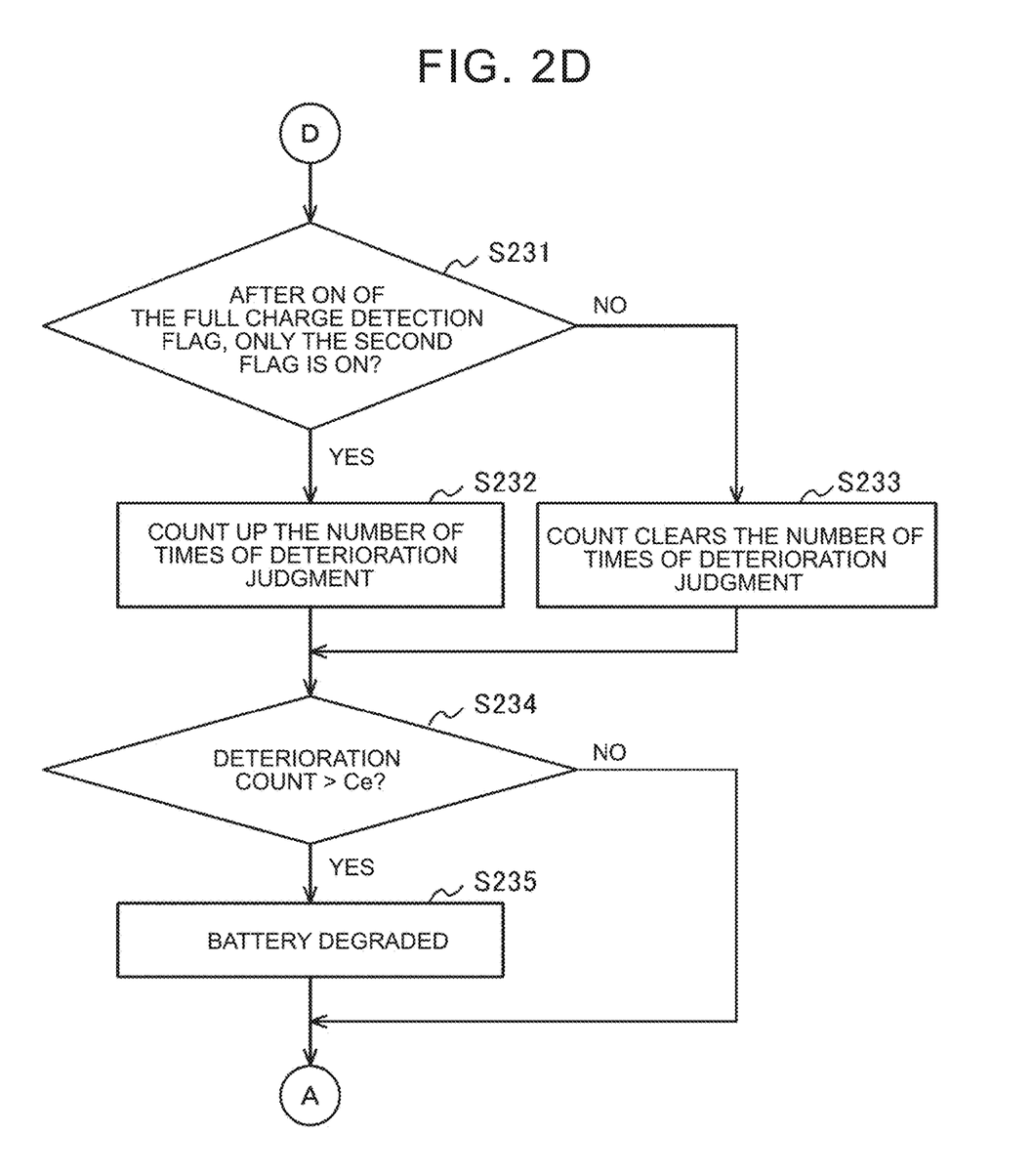
FIG. 2D is a diagram of a battery management control process executed by a battery management system.

The battery determination unit 22 of the center 20 determines whether only the second flag is turned ON after the full charge detection flag is turned ON in the above S206. This determination is performed in order to estimate whether or not the capacity of the battery 11 is deteriorated because the voltage of the deteriorated battery 11 is sharply lowered with a small charge/discharge amount as described above. When the battery determination unit 22 determines that only the second flag is turned ON after the full charge detection flag is turned ON (S231, Yes), the process proceeds to S232. On the other hand, when the battery determination unit 22 determines that only the second flag is not turned ON after the full charge detection flag is turned ON (S231, No), the process proceeds to S233.

S232

The battery determination unit 22 of the center 20 increments the count value of the counter for counting the number of times of deterioration determination provided in advance by one, and counts up the number of times of deterioration determination. The initial value of this counter is zero. When the number of times of degradation determination is counted up by the battery determination unit 22, the process proceeds to S234.

S233

The battery determination unit 22 of the center 20 resets the count value of the counter for counting the number of times of deterioration determination to zero and clears the count of the number of times of deterioration determination.

When the number of times of degradation determination is counted and cleared by the battery determination unit 22, the process proceeds to S234.

S234

The battery determination unit 22 of the center 20 determines whether or not the number of times of degradation determination exceeds a predetermined number of times Ce. This determination is performed in order to determine that the capacity of the battery 11 is deteriorated, and the predetermined number of times Ce is set to any value capable of increasing the determination accuracy. When the battery determination unit 22 determines that the number of times of degradation determination exceeds the number-of-times Ce (S234, Yes), the process proceeds to S235. On the other hand, when the battery determination unit 22 determines that the number of times of degradation determination does not exceed the number-of-times Ce (S234, No), the process proceeds to S201.

S235 The battery determination unit 22 of the center 20 determines that the capacity of the battery 11 is deteriorated. The degradation status of the battery 11 may be expressed by switching ON/OFF of a predetermined flag. When the battery determination unit 22 determines that the battery 11 is deteriorated, the process proceeds to S201. When it is determined that the battery 11 is deteriorated, the notification unit 23 of the center 20 may notify the user or the driver of the vehicle 10 (display on an in-vehicle display, message transmission to a smartphone, or the like) of the fact that the battery 11 is in a deteriorated state and the contents prompting the dealer to check and replace the battery 11.

S241

Figure 2E:
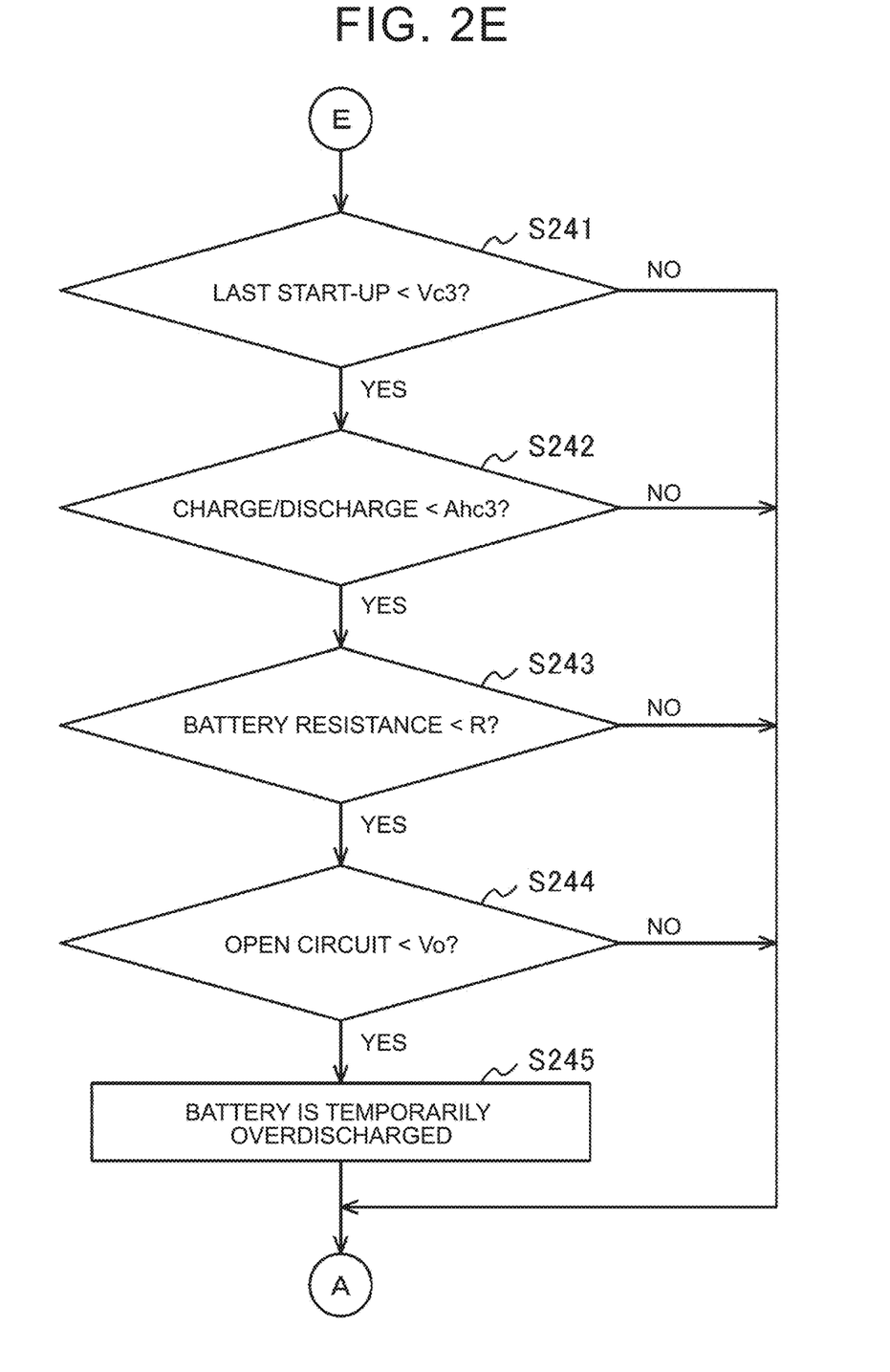
FIG. 2E is a diagram of a battery management control process executed by a battery management system.

The battery determination unit 22 of the center 20 determines whether or not the start-up voltage of the battery 11 when the vehicle 10 performs the last (latest) start-up operation is less than the predetermined third voltage Vc3, based on the vehicle data stored in the predetermined storage unit or the like. This determination is one condition for estimating a temporary overdischarge state of the battery 11 during parking. When the first state and the second state illustrated in FIGS. 3 and 4 are set, for example, the third voltage Vc3=11V can be set. When the battery determination unit 22 determines that the last startup voltage of the battery 11 is less than the third voltage Vc3 (S241, Yes), the process proceeds to S242. On the other hand, when the battery determination unit 22 determines that the last startup voltage of the battery 11 is equal to or higher than the third voltage Vc3 (S241, No), the process proceeds to S201.

S242

Based on the vehicle data, the battery determination unit 22 of the center 20 determines whether or not the charge/discharge amount of the battery 11 of the vehicle 10 being parked is less than the predetermined third charge/discharge amount Ahc3. This determination is one condition for estimating a temporary overdischarge state of the battery 11 during parking. When the first state and the second state illustrated in FIGS. 3 and 4 are set, for example, the third charge/discharge amount Ahc3=−20 Ah can be set. When the battery determination unit 22 determines that the charge/discharge amount of the battery 11 is less than the third charge/discharge amount Ahc3 during parking (S242, Yes), the process proceeds to S243. On the other hand, when the battery determination unit 22 determines that the charge/discharge amount of the battery 11 is equal to or greater than the third charge/discharge amount Ahc3 during parking (S242, No), the process proceeds to S201.

S243

The battery determination unit 22 of the center 20 determines, based on the vehicle data, whether or not the resistance of the battery 11 of the vehicle 10 being parked is less than the predetermined resistance R. This determination is one condition for estimating a temporary overdischarge state of the battery 11 during parking. For example, the resistance R may be 15 mΩ. When the battery determination unit 22 determines that the resistance of the battery 11 of the vehicle 10 being parked is less than the resistance R (S243, Yes), the process proceeds to S244. On the other hand, when the battery determination unit 22 determines that the resistance of the battery 11 of the vehicle 10 being parked is equal to or greater than the resistance R (S243, No), the process proceeds to S201.

S244

The battery determination unit 22 of the center 20 determines whether or not Open Circuit Voltage (OCV) of the battery 11 of the vehicle 10 being parked is less than the predetermined fourth voltage Vo. This determination is one condition for estimating a temporary overdischarge state of the battery 11 during parking. When the first state and the second state illustrated in FIGS. 3 and 4 are set, for example, the fourth voltage Vo=11V can be set. When the battery determination unit 22 determines that the open-circuit voltage of the battery 11 of the vehicle 10 being parked is less than the fourth voltage Vo (S244, Yes), the process proceeds to S245. On the other hand, when it is determined that the open-circuit voltage of the battery 11 of the vehicle 10 being parked is equal to or higher than the fourth voltage Vo (S244, No), the process proceeds to S201.

S245

When the battery 11 satisfies all of S244 from the above S241 during parking, the battery determination unit 22 of the center 20 determines that the battery 11 is temporarily in the over-discharge state. The temporary overdischarge status of the battery 11 may be expressed by switching ON/OFF of a predetermined flag. When the battery determination unit 22 determines that the battery 11 is temporarily over-discharged, the process proceeds to S201. When it is determined that the battery 11 is temporarily in the over-discharge state, the notification unit 23 of the center 20 may notify the user of the vehicle 10 or the like (e.g., message transmission to the smartphone) of the fact that the battery 11 is in the over-discharge state and the contents prompting the start of the vehicle 10 for charging the battery 11.

As described above, the battery managing control executed by the center 20 of the present embodiment has been described with reference to FIGS. 2A to 2E, FIG. 3, and FIG. 4. However, this battery management control is an example, and can be appropriately changed or applied as follows, for example.

Figure 5:
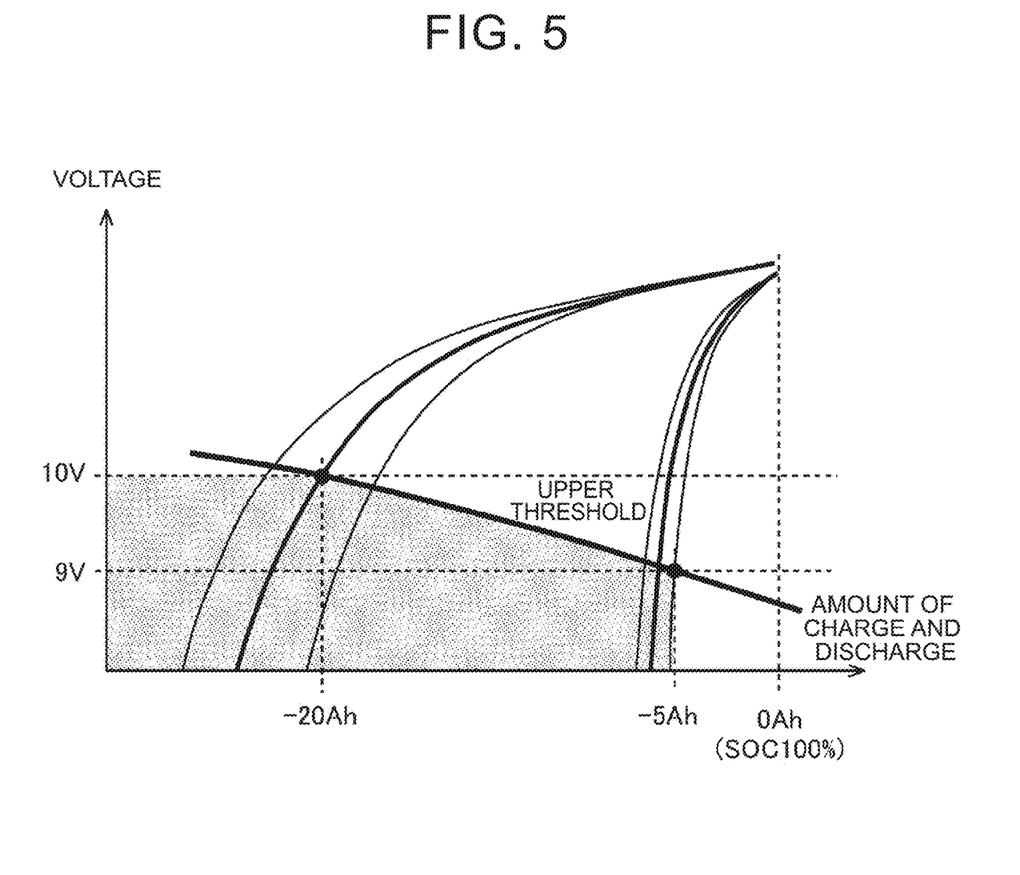
FIG. 5 is a diagram illustrating an example of a relationship between a voltage of a battery and a charge/discharge amount.

The determination of the temporary overdischarge state of the battery 11 may be performed in a range other than the first state and the second state illustrated in FIG. 4. For example, as shown in FIG. 5, a data map (shaded area in FIG. 5) in which an upper limit threshold is defined by a line (straight line or curve) passing through the point of the first voltage Vc1=10V and the first charge/discharge amount Ahc1=−20 Ah and the point of the second voltage Vc2=9V and the second charge/discharge amount Ahc2=−5 Ah may be created, and if the combination of the voltage and the charge/discharge amount is in the data map, it may be determined that the battery 11 is in a temporary overdischarge condition.

In addition, in S245 of FIG. 2E, only a part of S241 to S244 may be used as a condition for the battery determination unit 22 to determine the temporary overdischarge condition of the battery 11 when the vehicle 10 is parked. Which one of S241 to S244 is to be determined can be appropriately set in accordance with, for example, a usage environment of the battery 11, a usage state of the vehicles 10, and the like.

In addition, in order to extract only the influence of the decrease in the power storage rate (SOC) of the battery 11 with respect to the voltage of the battery 11 at the time of starting the vehicle 10, the first voltage Vc1 and the second voltage Vc2 which are thresholds may be corrected based on the influence of the temperature change and the start-up current. Specifically, a reference value (e.g., 25° C. and −40 A) of the temperature-change and the start-up current is determined, and the first voltage Vc1 and the second voltage Vc2 are corrected based on the variation from the reference value.

Further, in S231 shown in FIG. 2D, instead of determining that the voltage of the battery 11 is sharply decreased with a small charge/discharge amount by determining that only the second flag is ON (the start-up voltage is less than the second voltage Vc2 and the charge/discharge amount is less than the second charge/discharge amount Ahc2), it may be determined that the rate of change of the voltage and the charge/discharge amount (slope=Δ voltage/Δ charge/discharge amount) exceeds a predetermined reference value (for example, 0.6).

Operations and Effects

According to the battery management system 1 according to the embodiment of the present disclosure described above, the temporary overdischarge state (voltage drop) of the battery 11 is detected by using both the voltage of the battery 11 and the charge/discharge amount of the battery 11 at the time of starting the vehicle 10. As a result, it is possible to suppress the error influence of both the voltage and the charge/discharge amount in the battery 11, and thus it is possible to accurately detect the temporary overdischarge state of the battery 11. Therefore, at the time of starting of the vehicle 10, the storage rate of the battery 11 (SOC) cannot be secured the required voltage for starting low, it is possible to avoid becoming non-startable (battery rise).

In addition, according to the battery management system 1 of the present embodiment, a threshold value for the battery 11 in which the capacity degradation is assumed is provided separately from the threshold value for the battery 11 in which the capacity is not deteriorated (decreased), and the temporary overdischarge state (voltage drop) of the battery 11 is detected. As a result, it is possible to suppress the error influence of the voltage and the charge-discharge amount in the battery 11, and thus it is possible to accurately detect the temporary overdischarge state and the deterioration state of the battery 11. Further, by providing a plurality of thresholds, it is possible to reduce the overdischarge state of the battery 11 even if the influence of the voltage variation and the offset error of the current sensor occurs. When a plurality of thresholds are provided, it is possible to detect a temporary overdischarge state even for the battery 11 whose capacity has deteriorated by setting the charge/discharge amount (absolute value) to be smaller as the voltage is lower. Further, the quality of the service provided to the user or the like can be improved by changing (switching) the notification content (or the notification method) depending on whether or not the temporary overdischarge state of the battery 11 is accompanied by capacity degradation.

Further, according to the battery management system 1 of the present embodiment, the charge/discharge amount of the battery 11 is set to zero each time the full charge state of the battery 11 is detected. As a result, the offset error of the current sensor affecting the charge/discharge amount of the battery 11 is reset at any time, so that the influence of the offset error of the current sensor on the charge/discharge amount for a long period of time can be suppressed.

Further, according to the battery management system 1 of the present embodiment, for the parked vehicle 10, the temporary overdischarge state of the battery 11 is determined based on a condition different from the condition of the vehicle 10 other than the parked vehicle. This makes it possible to accurately detect a temporary overdischarge state of the battery 11 even in a parked vehicle 10 that is not used for a long period of time and cannot acquire a starting voltage.

In the above embodiment, a configuration has been described in which the center 20 determines the state of the battery 11 based on vehicle data received from the vehicle 10. However, the vehicle 10 may have the function of the battery determination unit 22, and the vehicle 10 may determine the state of the battery 11 by itself based on the vehicle data. In this case, the vehicle 10 can notify the user, the center 20, or the like of the determination result of the state of the battery 11.

The battery management system of the present disclosure can be used for determining a state of a battery mounted in a vehicle, for example.

What is claimed is:

1. A battery management system comprising:
a vehicle; and
a center, wherein:
the vehicle includes an acquisition unit configured to acquire vehicle data including information on traveling and information on a voltage and a charge and discharge amount of a battery to be mounted;
the vehicle includes a transmission unit configured to transmit the vehicle data to the center;
the center includes a reception unit configured to receive the vehicle data from the vehicle;
the center includes a determination unit configured to determine a state of the battery based on the vehicle data;
when the vehicle is not parked, the determination unit is configured to integrate the charge and discharge amount of the battery every time the vehicle data is received, and reset an integrated value when a full charge state of the battery is detected; and
when the vehicle is not parked, the determination unit determines that the battery is in a temporary overdischarge state, when the voltage of the battery when the vehicle is started is less than a first voltage and the integrated value of the charge and discharge amount of the battery is in a first state in which the integrated value of the charge and discharge amount of the battery is less than a first charge and discharge amount.

2. The battery management system according to claim 1, wherein the determination unit determines that the battery is in the temporary overdischarge state, when the voltage of the battery when the vehicle is started is less than a second voltage smaller than the first voltage and the integrated value of the charge and discharge amount of the battery is in a second state in which the integrated value of the charge and discharge amount of the battery is less than a second charge and discharge amount larger than the first charge and discharge amount.

3. The battery management system according to claim 2, wherein the determination unit determines that the battery is in the temporary overdischarge state using a data map in which a threshold value is created based on the first voltage, the second voltage, the first charge and discharge amount, and the second charge and discharge amount.

4. The battery management system according to claim 2, wherein the determination unit determines that the battery is deteriorated when detection of the full charge state of the battery and transition to the second state are repeated a predetermined number of times.

5. The battery management system according to claim 1, wherein when the vehicle is parked, the determination unit determines that the battery is in the temporary overdischarge state when the voltage of the battery when the vehicle was last started is less than a third voltage, the voltage of the battery when the vehicle is parked is less than a fourth voltage, the integrated value of the charge and discharge amount of the battery when the vehicle is parked is less than a third charge and discharge amount, and resistance of the battery when the vehicle is parked is equal to or larger than predetermined resistance.

6. The battery management system according to claim 4, wherein the center further includes a notification unit that gives notification that differs between a case in which the battery is determined to be in the temporary overdischarge state and a case in which the battery is determined to be in a deteriorated state.

* * * * *